United States Patent [19]

Koike

[11] Patent Number: 4,827,465

[45] Date of Patent: May 2, 1989

[54] SIMPLIFIED SOUND REPRODUCING DEVICE HAVING A MEANS FOR PREVENTING COLLISION BETWEEN A REPRODUCING STYLUS AND A RECORD DISC

[75] Inventor: Eishi Koike, Sagamihara, Japan

[73] Assignee: Ozen Corporation, Tokyo, Japan

[21] Appl. No.: 138,445

[22] Filed: Dec. 28, 1987

[30] Foreign Application Priority Data

Dec. 29, 1986 [JP] Japan .................................. 61-315640

[51] Int. Cl.$^4$ ............................................. G11B 17/06
[52] U.S. Cl. ............................................ 369/67; 369/66
[58] Field of Search ......................... 369/63, 65, 66, 67

[56] References Cited

U.S. PATENT DOCUMENTS

| | | | |
|---|---|---|---|
| 4,648,086 | 3/1987 | Koike | 369/63 |
| 4,680,747 | 7/1987 | Blake | 369/65 |
| 4,694,446 | 9/1987 | Koike | 369/63 |

*Primary Examiner*—Steven L. Stephan

*Attorney, Agent, or Firm*—Arnold S. Weintraub; William D. Blackman

[57] ABSTRACT

A simplified sound reproducing device having a means for preventing collision between a record disc and a sound reproduction stylus is provided. According to the device, during the time of transportation a start lever is set at a position where it has been turned, whereby the center pin is moved downwardly by an inclined face formed on the start lever so that the record disc can be normally held at a position where it is placed away form the pickup of the sound reproducing device. When it is required to use the reproducing device for the purpose of playing, the start lever is turned back to the position where it had been before the first turning for the transportation, thereby subsequent pushing down of the start lever will make the inclined face move the center pin downward so as to move the record disc away from the pickup, then, the pickup is allowed to return to its starting point of sound reproduction and energizes a motor for starting the sound reproduction again.

3 Claims, 2 Drawing Sheets

SIMPLIFIED SOUND REPRODUCING DEVICE HAVING A MEANS FOR PREVENTING COLLISION BETWEEN A REPRODUCING STYLUS AND A RECORD DISC

BACKGROUND OF THE INVENTION

1. Field of the Invention

This invention relates to a simplified sound reproducing device having a means or device for preventing collision between a record disc and a sound reproducing stylus to be engaged with the record disc, and more particularly, it relates to a device of the kind suitable for use in a small sized simplified sound reproducing device.

2. Prior Art

Japanese Patent Publication No. Sho 57(1982)-10492 and No. Sho 55(1980)-35787 discloses a simplified sound reproducing device of the type comprising, a speaker diaphragm fixed in a casing, a sound transmitting member attached to the bottom of the speaker diaphragm, a pickup which slidably contacts the sound transmitting member and engages the recorded face of the record disc and thereby transmits the reproduced vibration to the speaker diaphragm. The former device is a kind where the pickup is fully supported by a speaker diaphragm, while in the latter device, the pickup can move toward the speaker diaphragm.

The drawback of the former is that if an impact force is applied to the outside of the casing, during transportation, it tends to depress the pickup toward the record disc, causing the reproduction stylus of the pickup to thrust through the record disc and damage it or make the record disc inoperative.

On the other hand, the latter is constructed so that a bar member of the sound transmitting member contacts the inner wall of the acoustic cylinder while it is inserted into the acoustic cylinder, allowing a speaker diaphragm, a sound transmitting member and a pickup to be relatively shifted.

Accordingly, if any aspect is applied to the outside casing of the device, it would not be transmitted to the pickup and thus the record disc is never damaged.

However, since the sound transmitting member is constructed so that it contacts the inner wall of the acoustic cylinder through the bar member, it requires considerable technical skill in designing and adjusting the device to obtain a satisfactory level of reproduced sound. This gives rise to high production costs, partly because the reproduced sounds collected by the sound transmitting member though the bar member are transmitted indirectly, and partly because the contact strength is not sufficiently high because the acoustic cylinder and the bar member are joined by surface contact under a lateral force.

SUMMARY OF THE INVENTION

In order to solve the drawbacks encountered in the prior art, the present invention adopted construction as described below, which will be explained in more detail in the preferred embodiment section with reference to the drawings attached to this specification.

According to the present invention, during the time of transportation a start lever is set at a position to which it has been turned, and the center pin is urged downward by an inclined face formed on the start lever so that the record disc can be normally held at a position away from the pickup of the sound reproducing device. When it is required to use the reproducing device for playing, the start lever is turned back to the initial position where it had been prior to the first turning. Subsequent pushing down of the start lever will cause the inclined face to urge the center pin downward so as to move the record disc away from the pickup. Then the pickup is allowed to return to its starting point of sound reproduction and energizes a motor for starting sound reproduction.

The sound reproducing device of the present invention has a construction, comprising:

a casing, a center pin received in the casing being movably supported and rotatable as well as movable in an axial direction, a record disc carried by the center pin so as to be movable in an axial direction together with the center pin, a pickup able to travel along the groove or grooves on the recorded face of the record disc between the starting point of sound reproduction and the end point of sound reproduction, a return spring which normally urges the pickup toward the starting point of sound reproduction, a sound transmitting member contacting the pickup and disposed so that the pickup can slidably move along the sound transmitting member, a speaker diaphragm fixedly disposed in the casing and being attached to the sound transmitting member, a stylus force spring urging the record disc together with the center pin toward the pickup, a belt drive system, an electric motor connected to the belt drive system for rotating the record disc and a power supply circuit having a reproduction terminating switch which opens the power supply circuit when held by the pickup at the end point of sound reproduction.

The device further comprises:

an upstanding needle shaft disposed upright in the casing, a start lever having an outer end and an inner end and being disposed in such a manner that its outer end projects outside the casing and its inner end extends to and above the top end face of the center pin, the intermediate portion of the lever being held by the needle shaft so as to be capable of being rotated and moved in its lengthwise direction, a positioning spring for normally urging the start lever outwardly of the casing, and the inner end of the start lever, being received within the casing and having a first inclined face close to the top end of the center pin and substantially perpendicular to the axis of the start lever, the start lever having a second inclined face close to the top of the center pin, with a portion extending therefrom above the top end of the center pin and connected to the first inclined face where the first inclined face acts to make the start lever turn and depresses the center pin downward, and the second inclined face acts to depress the center pin downward when the start lever is pushed inward against the positioning spring.

The device of the present invention operates as follows:

When the start lever is set at the position where it has been turned around the needle shaft, the first inclined face depresses the center pin downward, thereby the record disc integrally fixed with and carried by the center pin is pushed down together with the center pin by the inclined face formed on the start lever, so the record face is normally set away from the pickup.

When the start lever is set at the position before it has been turned around the needle shaft, the center pin and the record disc together return to the position where the recorded face of the record disc is ready for engagement with the pickup.

Subsequent pushing of the start lever inward in its lengthwise direction, causes the second inclined face to depress the center pin downward and sets the record disc away from the pickup. At this moment, if the pickup is on the end point of sound reproduction, the pickup is allowed to revert back to the starting point of sound reproduction by means of the return spring. As soon as the pickup leaves the end point of sound reproduction, the reproduction terminating switch closes the circuit and thus the power supply to the drive motor which rotates the record disc.

When the start lever is released from its depressed position, the start lever releases the center pin from its depressed state and the record disc returns to the position where it is ready for engagement with the pickup to start reproduction.

When the pickup reaches the end point of reproduction after having finished its scanning on the recorded face, it will open the terminating switch, thus cutting the power supply to the motor. The motor then stops its rotation leaving the pickup at its engaged state at the end point of sound reproduction.

The preferred embodiment of the present invention will now be explained with reference to the accompanying drawings.

DETAILED DESCRIPTION OF THE PREFERRED EMBODIMENT

Figure 1:
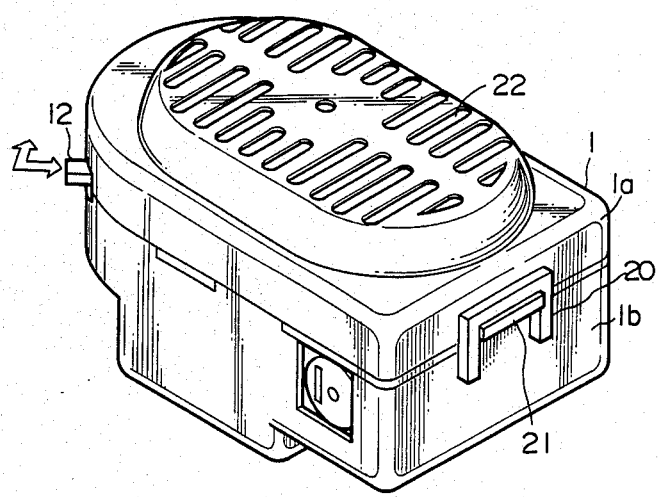
FIG. 1 is a perspective view showing a simplified sound reproducing device according to the present invention.

FIG. 1 shows a whole small sized simplified sound reproducing device of the present invention.

A casing 1 comprises a cover lid 1a and chassis 1b laid on and fixed to the cover lid.

A lock ring 20 is integrally attached to one end of the chassis 1b and a hook 21 which projects from one end of the cover lid 1a.

The lock ring 20 and hook 21, together with other locking means (not shown) disposed on the opposite end of the casing 1, act to fix the cover lid 1a to the chassis 1b.

Almost all the reverse side of the cover lid 1a defines a recessed space to be utilized as a speaker housing, which further forms a plurality of sound emitting slits 22 through which the sound reproduced by the device can emit outward.

Figure 2:
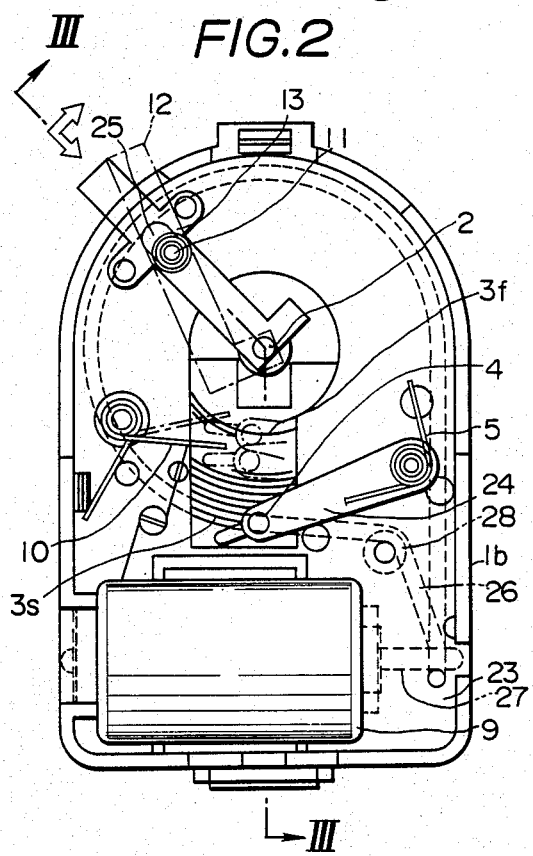
FIG. 2 is a plan view showing the simplified sound reproducing device from which the cover lid thereof has been removed.
Figure 3:
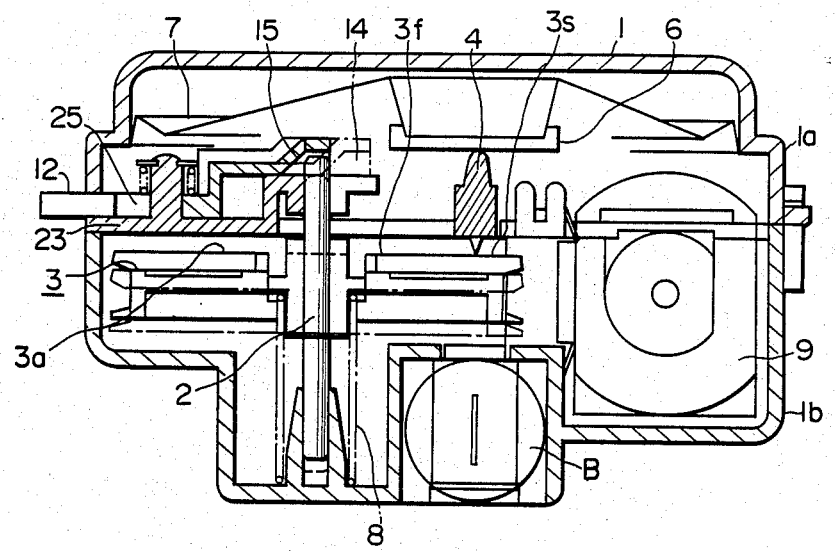
FIG. 3 is a cross sectional view taken along line III—III of FIG. 2 with the cover lid having been replaced.

As shown in FIGS. 2 and 3, the chassis 1b comprises a center pin 2 disposed upright on the base thereof, a record disc 3 carried integrally by the center pin 2, an electric motor 9 and a battery B as a power source.

The center pin 2 is rotatable as well as movable in an axial direction. Accordingly, the record disc 3 can rotate and travel in an axial direction while accompanying the center pin 2.

The record disc 3 has a starting point of sound reproduction 3s on its outer margin and an end point 3f at its inner peripheral margin, respectively. The record disc 3, together with the center pin 2, are resiliently supported by a stylus force spring 8 disposed between the chassis 1b and the center pin 2.

A supporting plate forming an upper deck 23 of the chassis 1b carries thereon a tone arm 24 having a front end carrying a pickup 4 and a rear end being swingably supported, a start lever 12 with an inside end and an outside end, and a reproduction terminating switch 10. The start lever 12 is capable of being manipulated in two directions as shown by thick arrow lines.

The pickup 4 can travel along the path between the starting point of sound reproduction 3s and the end point 3f.

The reproduction terminating switch 10 is disposed at the halfway point of the power supply line between the motor 9 and the battery B, and extends to a position where it can engage the end point of reproduction 3f along the path of the pickup 4, so it is ready to open while being held by the pickup 4 and thereby cuts off the power supply circuit.

A return spring 5, urges the pickup 4 through the tone arm 24 to normally move away from both the starting point of sound reproduction 3s and the record face 3a of the record disc 3.

As shown in FIGS. 2 and 3 the start lever 12 has its outside end projecting outside the casing 1, while the inside end extends toward, and hangs over the center pin 2.

This start lever 12 has, at its lengthwise intermediate portion, an oblong hole 25, extending along the length of the lever, through which a needle shaft 11 projecting from the supporting plate 23 is inserted. Thus, the start lever 12 not only can be moved in a lengthwise direction but also can be turned around the pin 11.

In addition, the start lever 12 is normally urged outside the casing 1 by means of a positioning spring 13. The start lever 12 is urged toward the interior of the casing 1 against the resilient force given by the positioning spring.

Figure 4:
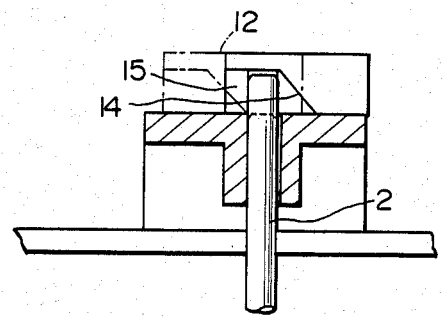
FIG. 4 is an enlarged view showing the inner end face of a start lever.

As can be clearly seen in FIGS. 3, and FIG. 4 which shows the end face of the inner end of the start lever 12, there are provided two inclined faces 14 and 15.

The first inclined face 14 is pointed toward the turning direction of the start lever 12, whereby the start lever 12 can position the center pin 2 in its lowered position when it is turned or in its raised position when it is returned back as shown by a dash and dot line or by a solid line, respectively, in FIG. 4, depending on the extent of its turning.

The second inclined face 15 also can set the center pin 2 either at an upwardly projected position when the start lever 12 is not pushed inward, or at its lowered position when the start lever 12 has been pushed inward (as shown in FIG. 3, by a solid line and a dash and dot line).

The record disc 3 has such a construction, that a record disc proper and a turn table are fixedly stacked together and a drive belt 26 fabricated of a resilient elastomer material is extended around the turn table.

As shown in FIG. 2, a drive motor 9 is laid with its side face on the base floor of the chassis so that the cooperation between the motor 9, the power supply circuit which includes the reproduction terminating switch 10, the drive belt 26, and the record disc 3 constitutes a belt drive system. An output shaft 27 is disposed under the support plate 23.

The drive belt 26 is extended around the output shaft 27 of the motor 9 while being guided by a roller 28 disposed halfway between the output shaft 27 and the record disc 3. Thus the record disc 3 is driven by the motor 9 with a belt drive system.

As shown in FIG. 3, a speaker diaphragm 7 is fixed in the speaker housing of the cover lid 1a.

A disc-like sound transmitting member 6 is affixed to the bottom of the speaker diaphragm 7.

The sound transmitting member 6 extends from the starting point of sound reproduction 3s to the end point of sound reproduction 3f to cover the travel stroke of the pickup 4.

Next, the operation of the simplified sound reproducing device of this invention will be explained.

When the pickup 4 is placed at the end point of sound reproduction 3f and acts to hold the terminating switch 10 in an OFF position, depression of the start lever 12 will cause the end tip of the start lever 12, to move to the position shown by the dash and dot line shown in FIG. 3. Then the inclined face 15 of the lever will push the top end of the center pin 2 and urge the center pin downward. This, in turn, causes the record disc 3 to lower into the position shown by the dash and dot line and to move away from the reproduction stylus of the pickup 4, which is now allowed to return to the starting point of sound reproduction 3s by being urged by the return spring 5. Since the pickup 4 moves away from the end point of sound reproduction 3f, the switch 10 for terminating sound reproduction turns ON to start the motor 9 for driving the record disc 3. Operator's depression on the start lever 12 will allow the lever itself to return to the initial position by virtue of the positioning spring 13.

Then, the center pin 2 moves upward and returns to the initial position, together with the record disc 3, by means of the resilient force imparted by the stylus force spring 8 and allows the pickup 4 to engage the recorded face 3a of the record disc 3, resulting in starting of the sound reproduction.

As reproduction proceeds, the moment when the pickup 4 arrives at the end point of sound reproduction 3f, the pickup 4 triggers the reproduction terminating switch 10 again and turns it to the OFF position cutting off the power supply to the motor 9 and stopping the rotation of the motor 9, leaving the pickup 4 at the end point of sound reproduction 3f, which is still engaged with the recorded face of the record disc 3.

If it is necessary to move the reproducing device, for example, to transport a simplified sound reproducing device of this kind, an impact to cover lid 1a of the casing 1 and subsequently to the chassis 1b may occur in such a manner that it causes damage to the casing 1, which gives rise to pressure on the pickup 4 through the sound transmitting member 6. Likewise the recorded face of the record disc 3 could be pierced by the sound reproduction stylus attached to the sound transmitting member. Such an accident often happens with small simplified sound reproducing devices, where the space between the pickup 4 and the record disc is usually small.

However, according to the present invention, if only the start lever 12 is turned under to the position shown by the dash and dot line in FIG. 2, the first inclined face 14 will be shifted to the position shown by the dash and dot line in FIG. 4, and the center pin 2 can be lowered by the first inclined face 14 and further guided to the horizontally extending reverse face of the start lever 12 so as to be tightly sustained there.

Under such conditions, the center pin 2 is held tightly by the horizontally extending reverse face of the start lever 12, creating a highly stable means of restraint.

Alternatively, if the face 14 is slightly inclined it is not necessary, to guide the center pin to the horizontally extending reverse face of the start lever to sustain the center pin in its stable depressed state. The center pin 2 under such depressed state as explained above, causes the recorded face of the record disc 3 to take and maintain a position away from the reproduction stylus as shown in FIG. 3. If it is required to use the reproduction device of this invention, it is only necessary for the user to turn and then depress the start lever 12 toward the casing 1 so as to return it to the position shown by the solid line, thereby releasing the stylus pressure having been applied thereto.

As explained above, the present invention makes it possible to transport even a small sized simplified sound reproducing device, while protecting the record disc from damage caused by an unsecured reproducing stylus that might result from an outside impact that causes deformation of the casing.

I claim:

1. A simplified sound reproducing device having a means for preventing a collision between the reproduction stylus and the record disc, comprising:
    (a) a casing,
    (b) a center pin received in said casing being movably supported thereby and being rotatable and movable in an axial direction,
    (c) a record disc carried by said center pin so as to be movable in an axial direction together with said center pin,
    (d) a pickup able to travel along a groove on a recorded face of the record disc between the starting point of sound reproduction and the end point of sound reproduction,
    (e) a return spring which normally urges said pickup toward the starting point of sound reproduction,
    (f) a sound transmitting member contacting said pickup and disposed so that said pickup can slidably move along said sound transmitting member,
    (g) a speaker diaphragm fixedly disposed in said casing and being attached to said sound transmitting member,
    (h) a stylus force spring urging said record disc together with said center pin toward the pickup,
    (i) a belt drive system, an electric motor connected to the belt drive system for rotating said record disc, and a power supply circuit having a reproduction terminating switch which opens the power supply circuit when held by said pickup at the end point of sound reproduction,
    (j) an upstanding needle shaft disposed in the casing,
    (k) a start lever having an outer end and an inner end and being disposed in such a manner that its outer end projects outside the casing and its inner end extends to the top end face of said center pin, the intermediate portion of the start lever being held by said needle shaft so as to be capable of being rotated and moved in its lengthwise direction,
    (l) a positioning spring normally urging said start lever outside the casing, and wherein the inner end of the start lever is received within said casing and has a first inclined face proximate the top end of the center pin, the start lever having a second inclined face proximate the top of the center pin, with the first inclined face acting to let said start lever turn and depress down said center pin, while the second inclined face acts to depress said center pin downward when the start lever is pushed inward against the positioning spring.

2. A simplified sound reproducing device having a means for preventing collision from occurring between the reproduction stylus and the record disc as claimed in claim 1, wherein said positioning spring is constructed as a coil spring turned around said needle shaft and the two opposite tip ends thereof are placed on opposite sides of said start lever.

3. A simplified sound reproducing device having a means for preventing a collision between the reproduction stylus and the record disc as claimed in claim 1, wherein the angle of the first inclined face of the start lever is set in such a manner that, at the position where the start lever is turned, either the tip end of the center pin can be positioned under the flat reverse face of the start lever or the start lever can be held at its turned position by the friction between the inclined face and the tip end of the center pin.

* * * * *